United States Patent [19]

Smith et al.

[11] Patent Number: 4,862,271
[45] Date of Patent: Aug. 29, 1989

[54] VIDEO SIGNAL INTERPOLATOR WITH PEAKING

[75] Inventors: Terrence R. Smith, Westmont; Michael A. Isnardi, Plainsboro; Jack S. Fuhrer, Princeton; Chandrakant B. Patel, Hopewell, all of N.J.

[73] Assignee: General Electric Company, Princeton, N.J.

[21] Appl. No.: 228,192

[22] Filed: Aug. 4, 1988

Related U.S. Application Data

[62] Division of Ser. No. 78,341, Jul. 27, 1987.

[51] Int. Cl.$^4$ .................. H04N 5/208; H04N 5/262
[52] U.S. Cl. ............................ 358/166; 358/22; 358/37; 358/160; 364/724.1
[58] Field of Search .............. 364/724.1, 723; 358/11, 358/37, 166, 21 R, 13, 160, 22; 382/47

[56] References Cited

U.S. PATENT DOCUMENTS

| | | | |
|---|---|---|---|
| 4,528,585 | 7/1985 | Bolger | 358/22 |
| 4,616,252 | 10/1986 | Schiff | 358/23 |
| 4,623,913 | 11/1986 | Fling et al. | 358/11 |
| 4,656,515 | 4/1987 | Christopher | 358/22 |
| 4,694,414 | 9/1987 | Christopher | 364/724 |
| 4,698,673 | 10/1987 | Johnson | 358/11 |
| 4,703,353 | 10/1987 | David | 358/160 |
| 4,575,384 | 7/1988 | Nonweiler et al. | 358/22 |

FOREIGN PATENT DOCUMENTS

| | | | |
|---|---|---|---|
| 181953 | 5/1986 | European Pat. Off. | 364/723 |
| 51387 | 3/1985 | Japan | 358/28 |

OTHER PUBLICATIONS

Ser. No. 078,150 filed Jul. 27, 1987 for C. H. Strolle, B. J. Roeder, T. R. Smith and M. A. Isnardi, titled "Compatible Widescreen Television System".

Ser. No. 078,340 filed Jul. 27, 1987 for M. A. Isnardi and C. B. Patel, titled "Video Signal Processor with Alternate Subcarrier".

Ser. No. 089,637 filed Aug. 26, 1987 for M. A. Isnardi, titled "Apparatus for Processing High Frequency Information in a Widescreen Television System".

Ser. No. 139,340 filed Dec. 29, 1987 for M. A. Isnardi, titled "Extended Definition Widescreen Television Signal Processing System".

Ser. No. 139,339 filed Dec. 29, 1987 for J. S. Fuhrer, titled "Compatible Television System with Companding of Auxiliary Signal Encoding Information".

Ser. No. 139,337 filed Dec. 29, 1987 for M. A. Isnardi, titled "Television Signal Encoded with Auxiliary Vertical-Temporal Information".

Ser. No. 139,338 filed Dec. 29, 1987 for M. A. Isnardi and R. N. Hurst, Jr., titled "Apparatus for Pre-Conditioning Auxiliary Television Signal Information".

*Primary Examiner*—John W. Shepperd
*Attorney, Agent, or Firm*—Joseph S. Tripoli; Peter M. Emanuel; Ronald H. Kurdyla

[57] ABSTRACT

In a video signal expanding/compressing system including a video signal interpolator, video signals are peaked prior to interpolation. The amount of peaking is controlled in response to a signal representative of the distance between a pixel of an expanded/compressed video signal and a corresponding pixel of an original video signal.

14 Claims, 8 Drawing Sheets

VIDEO SIGNAL INTERPOLATOR WITH PEAKING

This application is a divisional of application Ser. No. 078,341 filed July 27, 1987.

BACKGROUND OF THE INVENTION

This invention concerns a widescreen television system that is compatible with conventional television receivers having a relatively smaller display aspect ratio.

A conventional television receiver, such as a receiver in accordance with NTSC broadcast standards adopted in the United States and elsewhere, has a 4:3 aspect ration (the ratio of the width to the height of a displayed image). Recently, there has been interest in using higher aspect ratios for television receiver systems, such as 2:1, 16:9 or 5:3, since such higher aspect ratios more nearly approximate or equal the aspect ration of the human eye than does the 4:3 aspect ratio of a conventional television receiver. Video information signals with a 5:3 aspect ratio have received particular attention since this ratio approximates that of motion picture film, and thus such signals can be transmitted and received without cropping the image information. However, widescreen television systems which simply transmit signals having an increased aspect ratio as compared to conventional systems are incompatible with conventional aspect ratio receivers. This makes widespread adoption of widescreen systems difficult.

It is therefore desirable to have a widescreen television system that is compatible with conventional television receivers. In accordance with the principles of the present invention, there are disclosed herein method and apparatus for encoding and decoding a compatible widescreen video signal representing a picture having an aspect ratio greater than the standard 4:3 aspect ratio.

SUMMARY OF THE INVENTION

In a disclosed preferred embodiment of a compatible widescreen television system employing apparatus in accordance with the principles of the present invention, a widescreen signal having left side, right side and center video information panels is converted into a signal compatible with a standard system, such as NTSC for example, by compressing side panel low frequency information of the widescreen signal into left and right overscan regions which are present in the standard system but not seen by a viewer, and by simultaneously time expanding the center panel information to occupy the standard display region seen by a viewer. High frequency side panel information is encoded by quadrature modulating such high frequency information on an alternate subcarrier signal other than the chrominance subcarrier.

In accordance with the principles of the present invention, video signals, illustratively time-expanded/-compressed video signals, are peaked before being interpolated. In accordance with a feature of the invention, the amount of peaking is controlled in response to a signal representative of the distance between a pixel of an expanded/compressed video signal and a corresponding pixel of an original video signal.

A brief overview of the system to be described will be helpful. A system intended to transmit wide aspect ratio pictures, e.g., 5:3, through a standard, e.g., NTSC, channel should achieve a high quality picture display by a widescreen receiver, while greatly reducing or eliminating observable degradations in a standard 4:3 aspect ratio display. The use of signal compression techniques on the side panels of a picture takes advantage of the horizontal overscan region of a standard NTSC television receiver display, but may sacrifice image resolution in the side panel regions of a reconstructed widescreen picture. Since compression in time results in an expansion in the frequency domain, only low frequency components would survive processing in a standard television channel, which exhibits a smaller bandwidth compared with that required for a widescreen signal. Thus, when the compressed side panels of a compatible widescreen signal are expanded in a widescreen receiver, there results a noticable difference between the resolution or high frequency content of the center portion of a displayed widescreen picture and the side panels, unless steps are taken to avoid this effect.

The Figures and associated description describe a system for developing a widescreen signal capable of being processed through a standard NTSC channel. The system also permits a widescreen receiver to recover a widescreen picture with good picture quality across the entire display.

Figure 1:
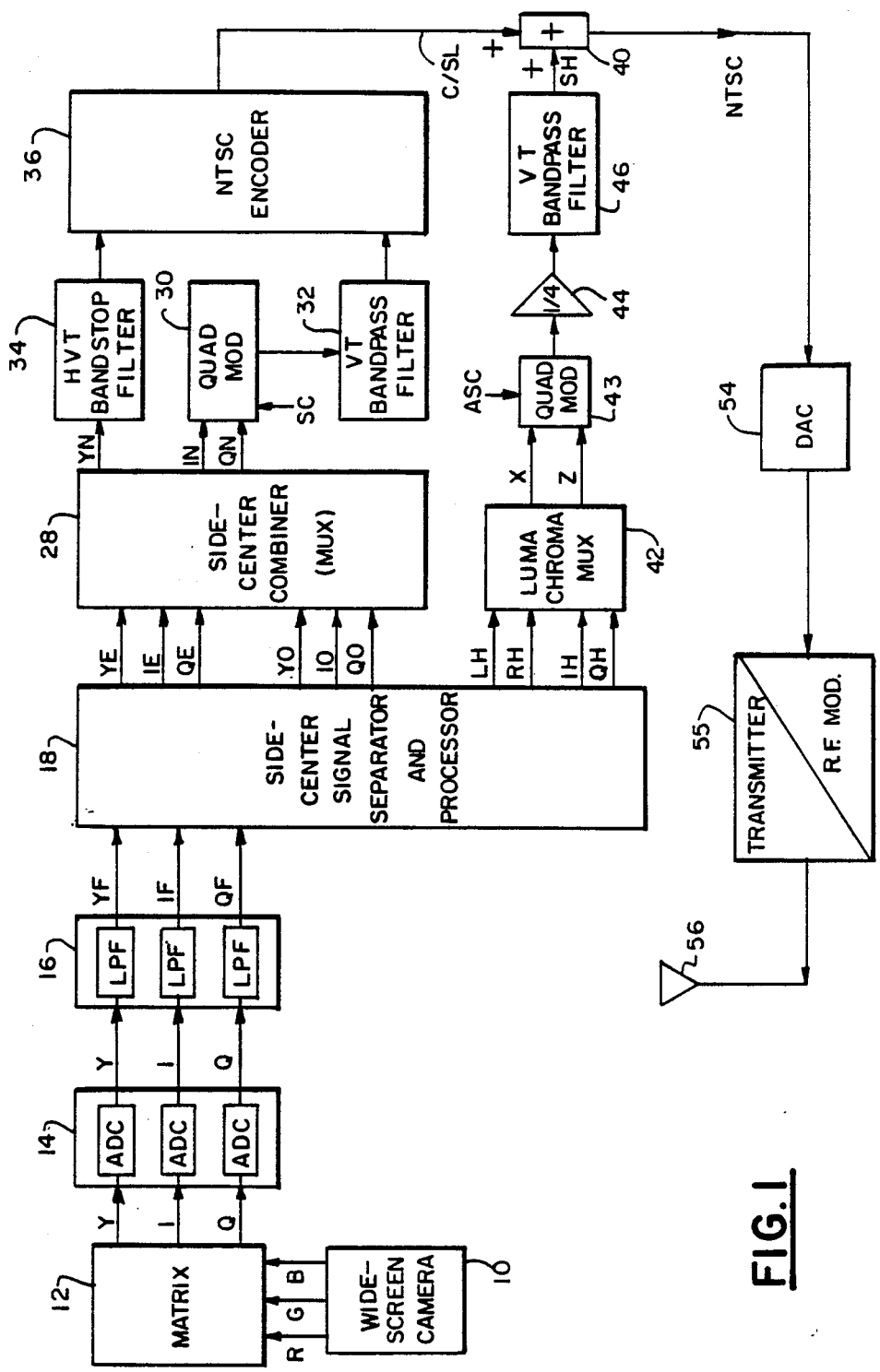
FIG. 1 shows a block diagram of an encoder for a compatible widescreen television system.

As will be seen from the encoder of FIG. 1, the use of spatial compression allows low frequency side panel information to be squeezed into the horizontal overscan region of a standard NTSC signal. The high frequency side panel information is spectrally shared with the standard NTSC signal through the video transmission channel, in a manner transparent to a standard receiver, through the use of an alternate subcarrier modulation technique.

Figure 2:
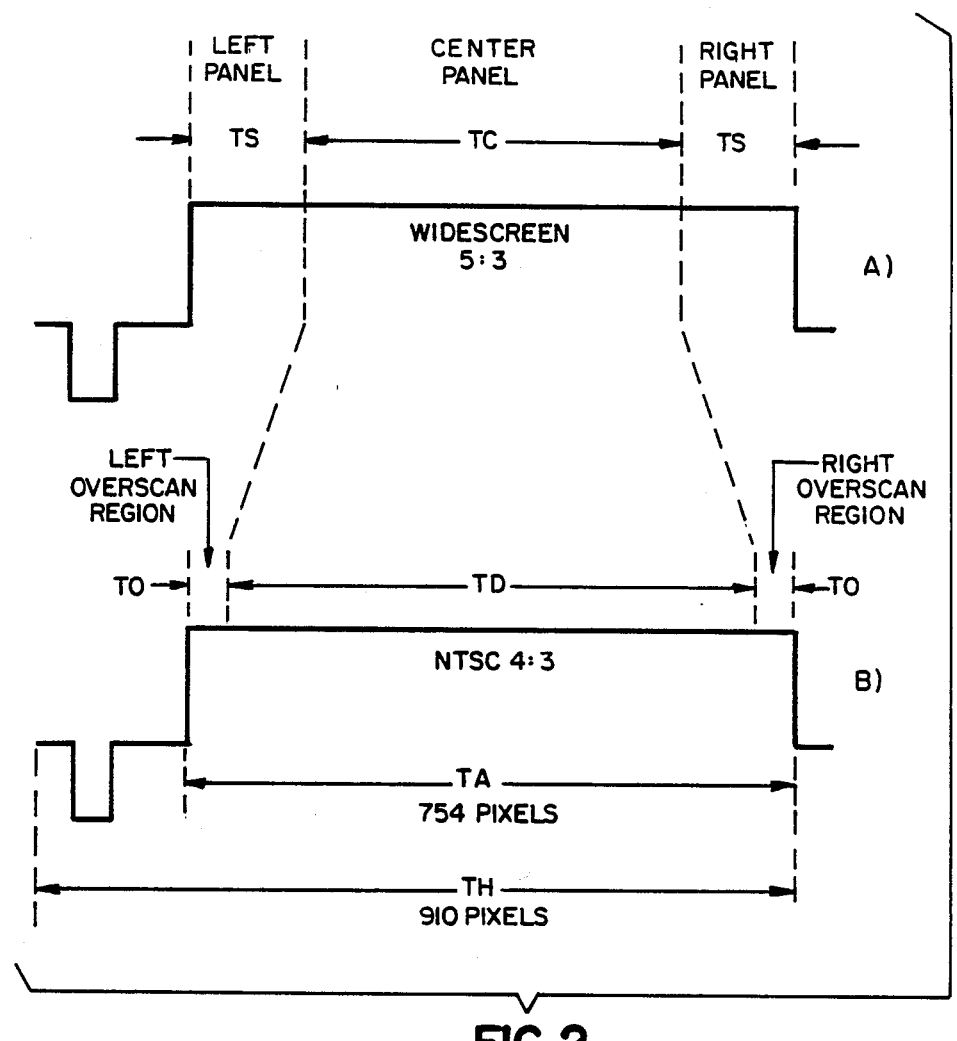
FIGS. 2-4 depict signal waveforms helpful in understanding the operation of the system of FIG. 1.

Before discussing the compatible widescreen encoding system of FIG. 1, reference is made to signal waveforms A and B of FIG. 2. Signal A is a 5:3 aspect ratio widescreen signal that has been converted to a standard NTSC compatible signal with a 4:3 aspect ratio as indicated by signal B. Widescreen signal A includes left and right side panel portions each associated with intervals TS which typically are of equal duration, and a center panel portion associated with an interval TC. Widescreen signal A has been converted to NTSC signal B by compressing certain side panel information completely into the horizontal overscan regions associated with time intervals TO. The NTSC signal has an active line interval TA (approximately 52.5 microseconds duration) which encompasses overscan intervals TO, a display time interval TD which contains the video information to be displayed, and a total horizontal line time interval TH of approximately 63.556 microseconds duration. Intervals TA and TH are the same for both the widescreen and NTSC signals. It has been found that almost all consumer television receivers have an overscan interval which occupies at least 4% of the total active line time TA, i.e., 2% overscan on the left and right sides. At a sampling rate of $4 \times f_{sc}$ (where $f_{sc}$ is the frequency of the color subcarrier), each horizontal line interval contains 910 pixels (picture elements) of which 754 constitute the active horizontal line image information to be displayed.

Returning to FIG. 1, a widescreen camera 10 provides a widescreen color signal with R, G, B components and a wide aspect ratio of 5:3 in this example. A widescreen camera is essentially identical to a standard NTSC camera except that a widescreen camera has a greater aspect ratio and a greater video bandwidth. The video bandwidth of a widescreen camera is proportional to the product of its aspect ratio and the total number of lines per frame, among other factors. Assuming constant velocity scanning by the widescreen camera, an increase in its aspect ratio causes a corresponding increase in its video bandwidth as well as horizontal compression of picture information when the signal is displayed by a standard television receiver with a 4:3 aspect ratio. For these reasons, it is necessary to modify the widescreen signal for full NTSC compatibility.

The color video signal processed by the encoder system of FIG. 1 contains both luminance and chrominance signal components. The luminance and chrominance signals contain both low and high frequency information, which in the following discussion will be referred to as "lows" and "highs", respectively.

The wide bandwidth widescreen color video signals from camera 10 are matrixed in a unit 12 to derive luminance component Y and color difference signal components I and Q from the R, G, B color signals. The wideband Y, I, Q signals are sampled at a four-times chrominance subcarrier rate $(4 \times f_{sc})$ and are converted from analog to digital (binary) form individually by separate analog-to-digital converters (ADC) in an ADC unit 14 before being filtered individually by separate horizontal low pass filters in a filter unit 16 to produce filtered signals YF, IF and QF. These signals are each of the form indicated by waveform A in FIG. 2. Luminance signal YF is bandwidth limited by filter 16 to CEF×4.2 MHz, or approximately 5 MHz, where CEF is the center panel expansion factor. This is necessary so that, after subsequent time expansion as will be discussed, the bandwidth of the center panel signal is reduced to 4.2 MHz, the bandwidth of an NTSC video signal. For a similar reason, signals IF and QF are bandwidth limited by filter 16 to CEF×500 KHz, or approximately 600 KHz. Filter unit 16 therefore exhibits a luminance cutoff frequency of approximately 5.0 MHz, and an I and Q cutoff frequency of approximately 600 KHz.

The bandwidths of the Y, I and Q filters of unit 16 are related to the center panel expansion factor, which in turn is a function of the difference between the width of an image displayed by a widescreen receiver and the width of an image displayed by a standard receiver. The image width of a widescreen display with a 5:3 aspect ratio is 1.25 times greater than the image width of a standard display with a 4:3 aspect ratio. This factor of 1.25 is a preliminary center panel expansion factor which must be adjusted to account for the overscan region of a standard receiver, and to account for an intentional slight overlap of the boundary regions between the center and side panels as will be explained. These considerations dictate a CEF of 1.19.

The wideband signals from filter unit 16 are processed by a side-center panel signal separator and processor 18 to produce three groups of output signals: YE, IE and QE; YO, IO and QO; and LH, RH, IH and QH. The first two groups of signals (YE, IE, QE and YO, IO, QO) are processed in a first channel which develops a signal containing a full bandwidth center panel component, and side panel luminance lows compressed into horizontal overscan regions. The third group of signals (LH, RH, IH, QH) is processed in a second channel which develops a signal containing side panel highs. When the output signals from the two channels are combined, an NTSC compatible widescreen signal with a 4:3 display aspect ratio is produced. Details of circuits comprising unit 18 will be shown and discussed in connection with FIGS. 5 and 6.

Figure 3:
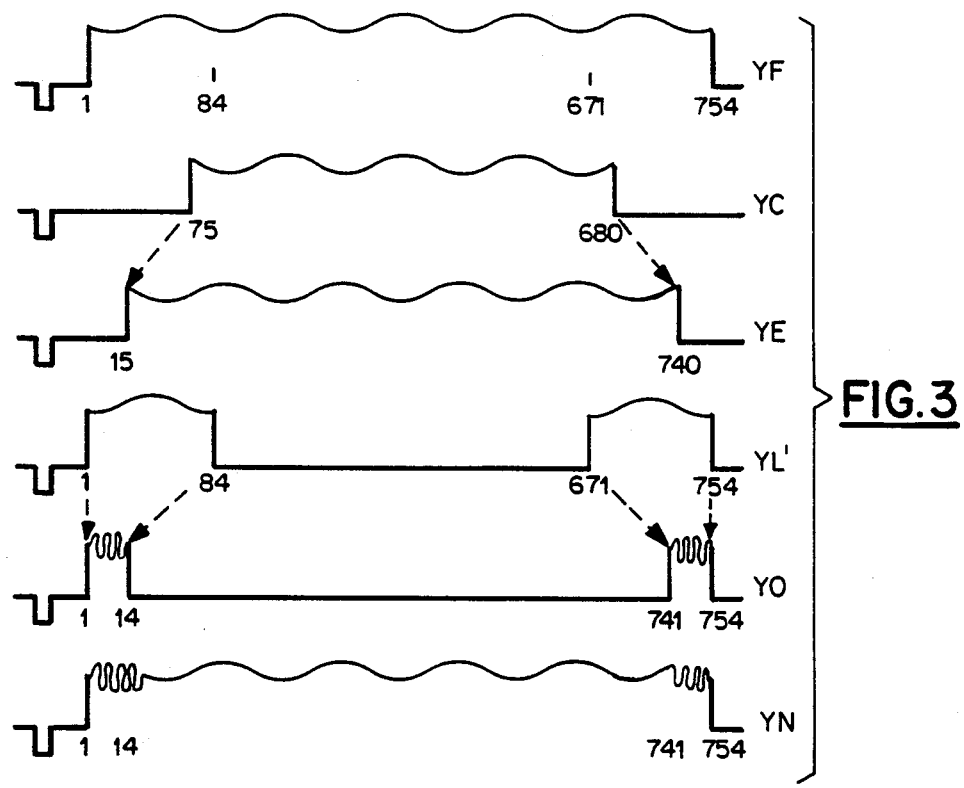

Signals YE, IE and QE contain complete center panel information and exhibit the same format, as indicated by signal YE in FIG. 3. Briefly, signal YE is derived from signal YF as follows. Widescreen wideband signal YF from signal YF as follows. Widescreen wideband signal YF from unit 16 contains pixels 1–754 occuring during the active line interval of the widescreen signal, containing side and center panel information. The wideband center panel information (pixels 75–680) is extracted as a center panel luminance signal YC via a time de-multiplexing process. Signal YC is time expanded by the center panel expansion factor of 1.19 (i.e., 5.0 MHz÷4.2 MHz) to produce NTSC compatible center panel signal YE. Signal YE exhibits an NTSC compatible bandwidth (0–4.2 MHz) due to the time expansion by factor 1.19. Signal YE occupies picture display interval TD (FIG. 2) between overscan regions TO (pixels 1–14 and 741–754). Signals IE and QE are developed from signals IF and QF, respectively, and are similarly processed in the manner of signal YE.

Signals YO, IO and QO provide the low frequency side panel information ("lows") which is inserted into the left and right horizontal overscan regions. Signals YO, IO and QO exhibit the same format, as indicated by signal YO in FIG. 3. Briefly, signal YO is derived from signal YF as follows. Widescreen signal YF contains left panel information associated with pixels 1–84 and right panel information associated with pixels 671–754. As will be discussed, signal YF is low pass filtered to produce a luminance lows signal with a 0–700 KHz bandwidth, from which signal a left and right side panel lows signal is extracted (signal YL' in FIG. 3) via a time de-multiplexing process. Luminance lows signal YL' is time compressed to produce side panel lows signal YO with compressed low frequency information in the overscan regions associated with pixels 1–14 and 741–754. The compressed side lows signal exhibits an increased BW proportional to the amount of time compression. Signals IO and QO are developed from signals IF and QF respectively, and are similarly processed in the manner of signal YO.

Signals YE, IE, QE and YO, IO, QO are combined by a side-center signal combiner 28, e.g. a time multiplexer, to produce signals YN, IN and QN with an NTSC compatible bandwidth and a 4:3 aspect ratio. These signals are of the form of signal YN shown in FIG. 3. Combiner 28 also includes appropriate signal delays for equalizing the transit times of the signals being combined. Such equalizing signal delays, are also included elsewhere in the system as required to equalize signal transit times.

Chrominance signals IN and QN are quadrature modulated on a subcarrier SC at the NTSC chrominance subcarrier frequency, nominally 3.58 MHz, by a modulator 30. The modulated signal is lowpass filtered in the vertical (V) and temporal (T) dimensions by means of a 2-D (two dimensional) filter 32 before being applied to a chrominance signal input of an NTSC encoder 36. Luminance signal YN is bandstop filtered in the horizontal (H), vertical (V) and temporal (T) dimensions by means of a 3-D (three dimensional) filter 34 before being applied to a luminance input of encoder 36. Filtering luminance signal YN and chrominance color difference signals IN and QN serves to assure that luminance-chrominance crosstalk will be significantly reduced after subsequent NTSC encoding. Luminance filter 34 also bandstop filters the luminance signal in the spectral region where the luminance side panel highs will be modulated, as will be discussed.

HVT bandstop filter 34 in FIG. 1 removes upwardly moving diagonal frequency components from luminance signal YN. These frequency components are similar in appearance to chrominance subcarrier components and are removed to make a hole in the frequency spectrum into which modulated chrominance side panel highs and luminance side panel highs will be inserted. The removal of the upwardly moving diagonal frequency components from luminance signal YN does not visibly degrade a displayed picture because it has been determined that the human eye is substantially insensitive to these frequency components. Filter 34 exhibits a cut-off frequency of approximately 1.5 MHZ so as not to impair luminance vertical detail information.

VT bandpass filter 32 reduces the chrominance bandwidth so that modulated chrominance side panel information can be inserted into the hole created in the luminance spectrum by filter 34. Filter 32 reduces the vertical and temporal resolution of chrominance information such that static and moving edges are slightly blurred, but this effect is of little or no consequence due to the insensitivity of the human eye to such effect.

An output signal C/SL from encoder 36 contains NTSC compatible information to be displayed, as derived from the center panel of the widescreen signal, as well as compressed side panel lows (both luminance and chrominance) derived from the side panels of the widescreen signal and situated in the left and right horizontal overscan regions not seen by a viewer of an NTSC receiver display. The compressed side panel lows in the overscan region represent one constituent part of the side panel information for a widescreen display. The other constituent part, the side panel highs, is developed as follows.

Processor 18 develops signals LH (left side panel luminance highs), RH (right side panel luminance highs), IH (I highs) and QH (Q highs) in the side panel highs signal processing channel.

Figure 4:
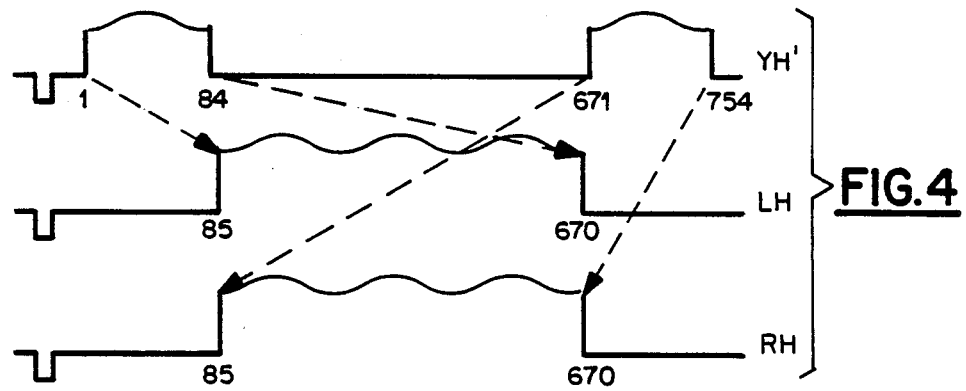

In FIG. 4, a signal YH', derived from widescreen signal YF, contains left panel high frequency information associated with left panel pixels 1-84, and right panel high frequency information associated with right panel pixels 671-754. The high frequency information encompasses a bandwidth of from 700 KHz to 5.0 MHz in this example. For each horizontal line, the left side panel highs component between pixels 1-84 of signal YH' is time expanded by a side expansion factor (thereby reducing its bandwidth accordingly) and is mapped into the center panel location occupied by pixels 85-670 to produce one component LH (FIG. 4) of the side panel information. Simultaneously, for each horizontal line, the right side panel highs component between pixels 671-754 of signal YH' is also time expanded and mapped into the center panel location occupied by pixels 85-670 to produce another simultaneous component RH (FIG. 4) of the side panel information. Simultaneously occurring signals RH and LH each exhibit a reduced bandwidth due to the side panel expansion factor (6.96), which is the ratio of the expanded side panel width to the original side panel width.

Signals LH and RH are time multiplexed with signals IH and QH by a luminance-chrominance multiplexer 42, to simultaneously produce side panel highs signal components X and Z. Signal component X is produced by inserting left highs luminance component LH (pixels 85-670) between the left and right side panel highs of color difference signal IH. Similarly, signal component Z is simultaneously produced by inserting right highs luminance component RH (pixels 85-670) between the left and right side panel highs of color difference signal QH.

Signals X and Z, containing the side panel highs information, each exhibit a 0-700 KHz bandwidth and are quadrature modulated onto a horizontally synchronized alternate subcarrier signal ASC by means of a quadrature modulator 43. The frequency of alternate subcarrier signal ASC is chosen to insure adequate separation (e.g. 20-30 db) of side and center information, and to have insignificant impact upon an image displayed by a standard NTSC receiver. In this embodiment signal ASC exhibits a frequency of 2.368 MHz.

The frequency of 2.368 MHz chosen for alternate subcarrier signal ASC is an interlace frequency at an odd multiple of one half of the horizontal line rate, ie., $301 \times f_H/2$. This alternate subcarrier frequency produces a fine, virtually imperceptible cross-hatch interference pattern which does not compromise the quality of a displayed picture, compared to a more serious "moving stripes" interface pattern which would be produced by a non-interlace subcarrier frequency. The 2.368 MHz subcarrier frequency advantageously resides in the frequency spectrum substantially symmetrically between the luminance vertical detail band and the modulated chrominance band, as shown in FIG. 11. As a result, the modulated side panel highs information occupies a ±700 KHz bandwidth between the vertical detail and chrominance frequency bands.

Quadrature modulation advantageously permits two narrowband signals to be transmitted simultaneously. Expanding the side panel highs signals results in their bandwidth being reduced, consistent with the narrowband requirements of quadrature modulation. The more the bandwidth is reduced, the less likely it is that interference between the carrier and modulating signals will result. It is also noted that the described technique of time multiplexing the luminance and chrominance side panel highs to produce signals X and Z before quadrature modulation advantageously requires only one subcarrier rather than two. Furthermore, since the DC component of the side panel information is compressed into the overscan region, the energy of the modulating signal, and therefore the potential interference of the modulating signal, are greatly reduced.

To reduce the likelihood of interference produced by the quadrature modulated signal, the signal from modulator 43 is attenuated by attenuator 44, which exhibits a signal gain of 0.25, before being bandpass filtered along diagonal axes in the vertical-temporal (V-T) plane by bandpass filter 46. The action of attenuator 44 has been found to reduce the visibility of certain types of interference caused by uncorrelated modulated side highs when viewed on a standard NTSC receiver. The attenuation achieved by network 44 can also be produced by adjusting the weighting coefficients of filter 46. A filtered quadrature modulated output signal SH from filter 46, containing the side panel highs, is combined with signal C/SL in combiner 40 to produce a widescreen NTSC compatible signal NTSC. Signal NTSC is converted to analog form by a digital-to-analog converter (DAC) 54 before being applied to an RF modulator and transmitter network 55 for broadcast via an antenna 56.

Figure 5:
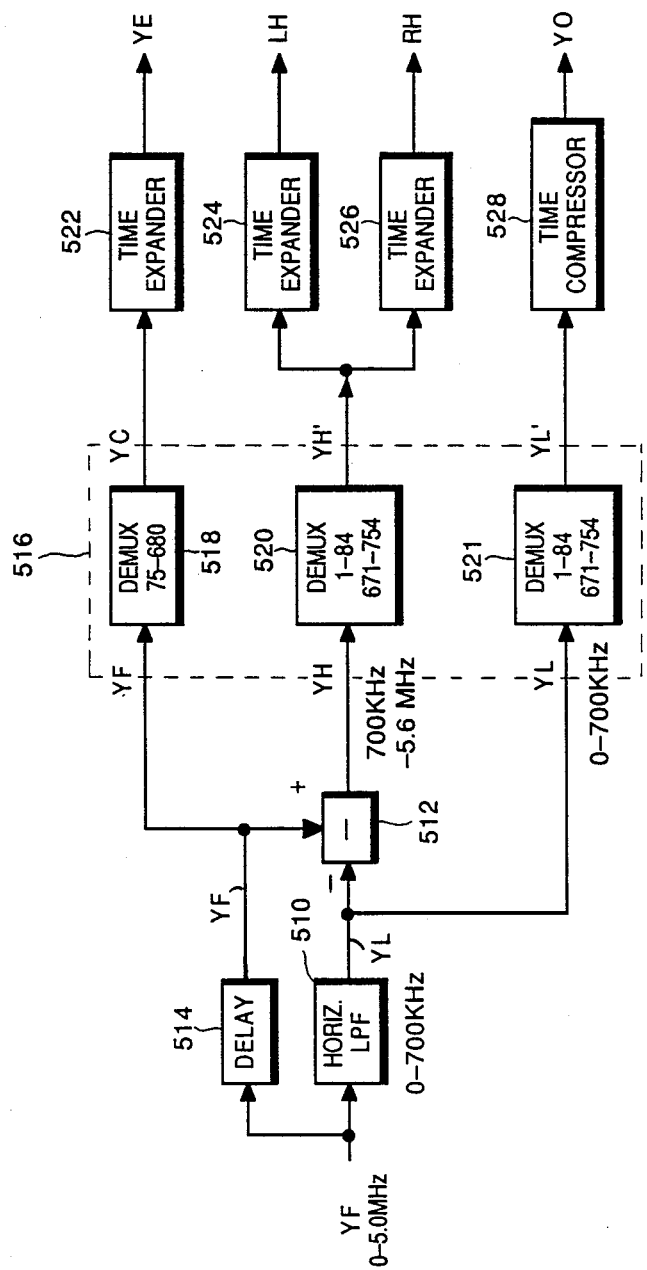
FIGS. 5 and 6 illustrate aspects of the system of FIG. 1 in greater detail.
Figure 6:
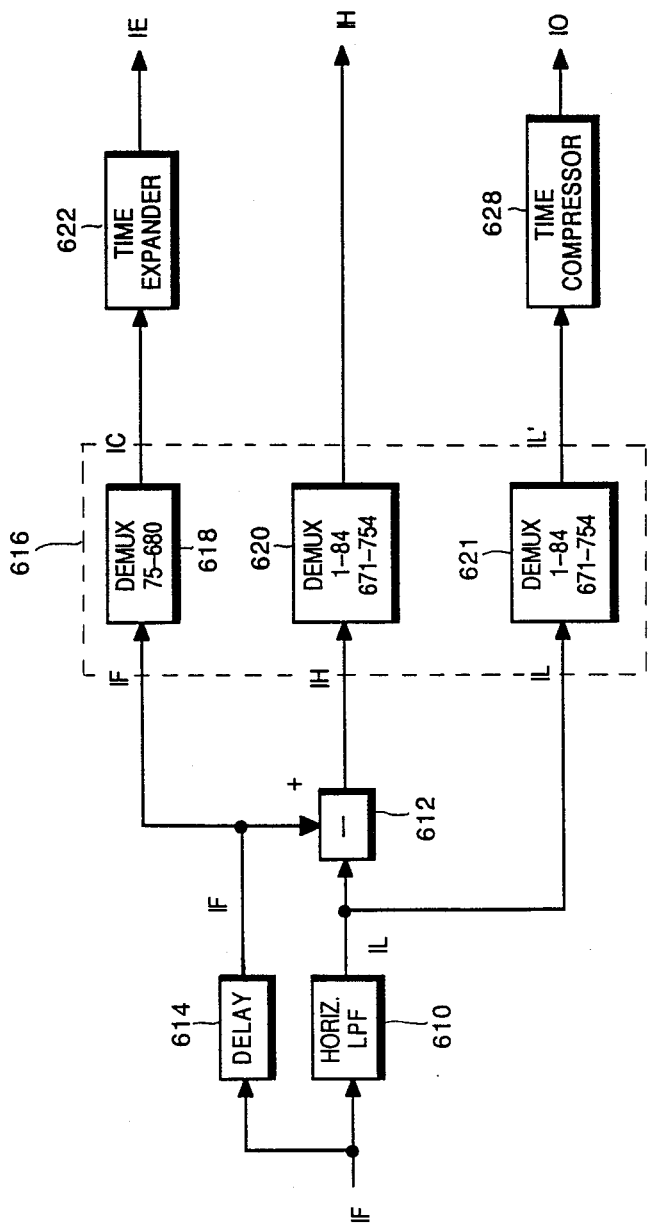

The encoded NTSC compatible widescreen signal broadcast by antenna 56 is intended to be received by both NTSC receivers and widescreen receivers. FIGS. 5 and 6 illustrate certain portions of the encoder system of FIG. 1 in more detail.

FIG. 5 illustrates apparatus included in processor 18 of FIG. 1 for developing signals YE, YO, LH and RH from wideband widescreen signal YF. Signal YF is horizontally low pass filtered by a filter 510 with a cutoff frequency of 700 KHz to produce low frequency luminance signal YL, which is applied to one input of a subtractive combiner 512. Signal YF is applied to another input of combiner 512 and to time de-multiplexing apparatus 516 after being delayed by a unit 514 to compensate for the signal processing delay of filter 510. Combining delayed signal YF and filtered signal YL produces high frequency luminance signal YH at the output of combiner 512.

Delayed signal YF and signals YH and YL are applied to separate inputs of de-multiplexing apparatus 516, which includes de-multiplexing (DEMUX) units 518, 520 and 521 for respectively processing signals YF, YH and YL. De-multiplexing units 518, 520 and 521 respectively derive full bandwidth center panel signal YC, side panel highs signal YH' and side panel lows signal YL' as illustrated in FIGS. 3 and 4.

Signal YC is time expanded by a time expander 522 to produce signal YE, while time expanders 524 and 526 expand signal YH' to produce signals LH and RH, respectively. Signal YC is time expanded with a center expansion factor sufficient to leave room for the left and right horizontal overscan regions. The center expansion factor (1.19) is the ratio of the intended width of signal YE (pixels 15–740) to the width of signal YC (pixels 75–680) as shown in FIG. 3. Signal YH' is expanded with a side expansion factor to produce signal LH. The side expansion factor (6.97) is the ratio of the intended width of signal LH (pixels 85–670) to the width of the left panel component of signal YH' (pixels 1–84) as shown in FIG. 4. Signal RH is produced by a similar process.

Signal YL' is compressed with a side compression factor by a time compressor 528 to produce signal YO. The side compression factor (0.166) is the ratio of the intended width of signal YO (e.g. left pixels 1–14) to the width of the corresponding portion of signal YL' (e.g. left pixels 1–84) as shown in FIG. 3. Time expanders 522, 524 and 526 and time compressor 528 can be of the type shown in FIG. 7, as will be discussed.

Signals IE, IH, IO and QE, QH, QO are respectively developed from signals IF and QF in a manner similar to that by which signals YE, YH' and YO are developed by the apparatus of FIG. 5. In this regard reference is made to FIG. 6, which illustrates apparatus for developing signals IE, IH and IO from signal IF. Signals QE, QH and QO are developed from signal QF in a similar manner.

Wideband widescreen signal IF, after being delayed by a unit 614, is coupled to de-multiplexing apparatus 616 and is also subtractively combined with low frequency signal IL from a low pass filter 610 in a subtractive combiner 612 to produce high frequency signal IL. Delayed signal IF and signals IH and IL are respectively de-multiplexed by de-multiplexers 618, 620 and 621 associated with de-multiplexing apparatus 616 to produce signals IC, IH and IL'. Signal IC is time expanded by an expander 622 to produce signal IE, and signal IL' is time compressed by a compressor 628 to produce signal IO. Signal IC is expanded with a center expansion factor similar to that employed for signal YC as discussed, and signal IL' is compressed with a side compression factor similar to that employed for signal YL', also as discussed.

In connection with the arrangements of FIGS. 5 and 6 it is noted that, e.g. in FIG. 5, filtering of the input signal prior to, rather than after, being applied to de-multiplexer 716 advantageously avoids unwanted signal edge transients in output signals LH, RH and YO. Specifically, de-multiplexer 716 produces output signals with sharp, well defined output transitions which would be distorted (e.g. smeared) by filtering the output signals from de-multiplexer 716.

Figure 7:
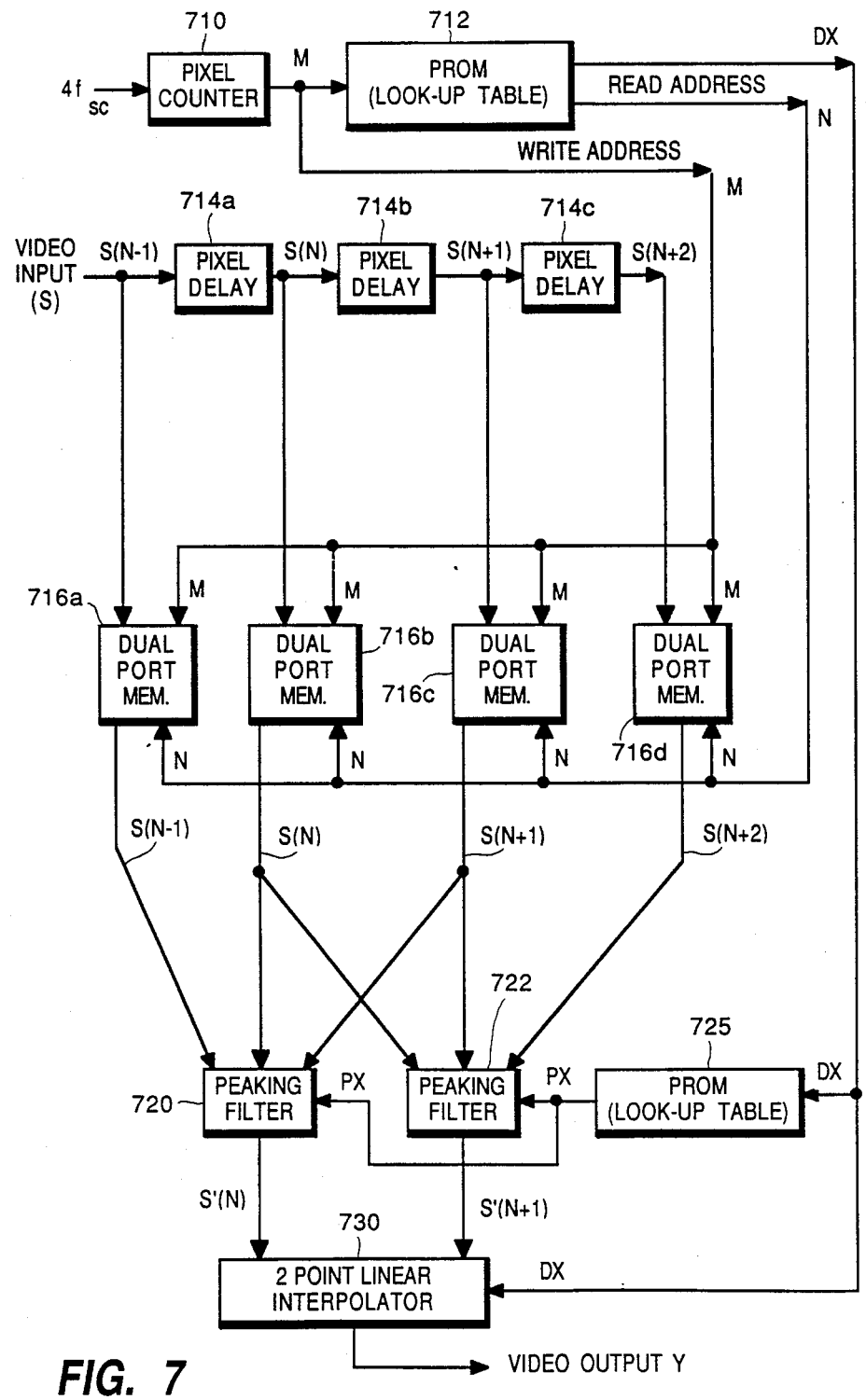
FIGS. 7 and 7a-7d illustrate aspects of apparatus in accordance with the principles of the present invention.
Figure 7A:
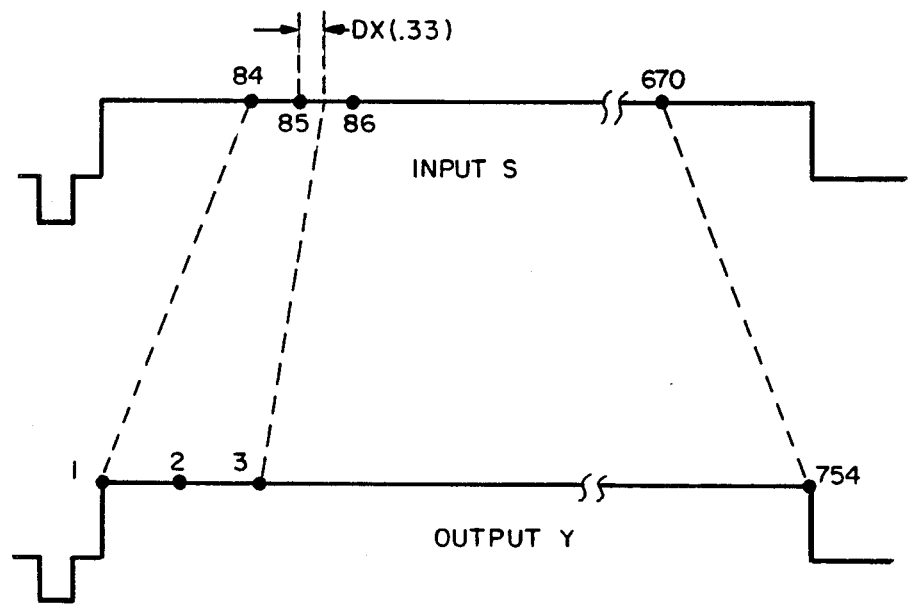

FIG. 7 illustrates raster mapping apparatus which can be used for the time expanders and compressors of FIGS. 5 and 6. In this regard, reference is made to the waveforms of FIG. 7a which illustrates the mapping process. FIG. 7a shows an input signal waveform S with a center portion between pixels 84 and 670 which is intended to be mapped into pixel locations 1–754 of an output waveform Y by means of a time expansion process. End point pixels 84 and 670 of waveform S map directly into end point pixels 1 and 754 of waveform Y. Intermediate pixels do not map directly on a 1:1 basis due to the time expansion, and in many cases do not map on an integer basis. The latter case is illustrated wherein, for example, pixel location 85.33 of input waveform S corresponds to integer pixel location 3 of output waveform Y. Thus pixel location 85.33 of signal S contains an integer part (85) and a fractional part DX (.33), and pixel location 3 of waveform Y contains an integer part (3) and a fractional part (0).

In FIG. 7, a pixel counter 710 operating at a $4xf_{sc}$ rate provides an output WRITE ADDRESS signal M representative of pixel locations (1 . . . 754) on an output raster. Signal M is applied to PROM (Programmable Read Only Memory) 712 which includes a look-up table containing programmed values depending upon the nature of raster mapping to be performed, eg., compression or expansion. In response to signal M PROM 712 provides an output READ ADDRESS signal N representing an integer number, and an output signal DX representing a fractional number equal to or greater than zero but less than unity. In the case of a 6-bit signal DX ($2^6=64$), signal DX exhibits fractional parts 0, 1/64, 2/64, 3/64 . . . 63/64.

PROM 712 permits expansion or compression of a video input signal S as a function of stored values of signal N. Thus a programmed value of READ ADDRESS signal N and a programmed value of fractional part signal DX are provided in response to integer values of pixel location signal M. To achieve signal expansion, for example, PROM 712 is arranged to produce signal N at a rate slower than that of signal M. Conversely, to achieve signal compression, PROM 712 provides signal N at a rate greater than that of signal M.

Video input signal S is delayed by cascaded pixel delay elements 714a, 714b and 714c to produce video signals S(N+2), S(N+1) and S(N) which are mutually delayed versions of the video input signal. These signals are applied to video signal inputs of respective dual port memories 716a-716d, as are known. Signal M is applied to a write address input of each of memories 716a-716d, and signal N is applied to a read address input of each of memories 716a-716d. Signal M determines where incoming video signal information will be written into the memories, and signal N determines which values will be read out of the memories. The memories can write into one address while simultaneously reading out of another address. Output signals S(N−1), S(N), S(N+1) and S(N+2) from memories 716a-716d exhibit a time expanded or time compressed format depending upon the read/write operation of memories 716a-716d, which is a function of how PROM 712 is programmed.

Figure 7B:
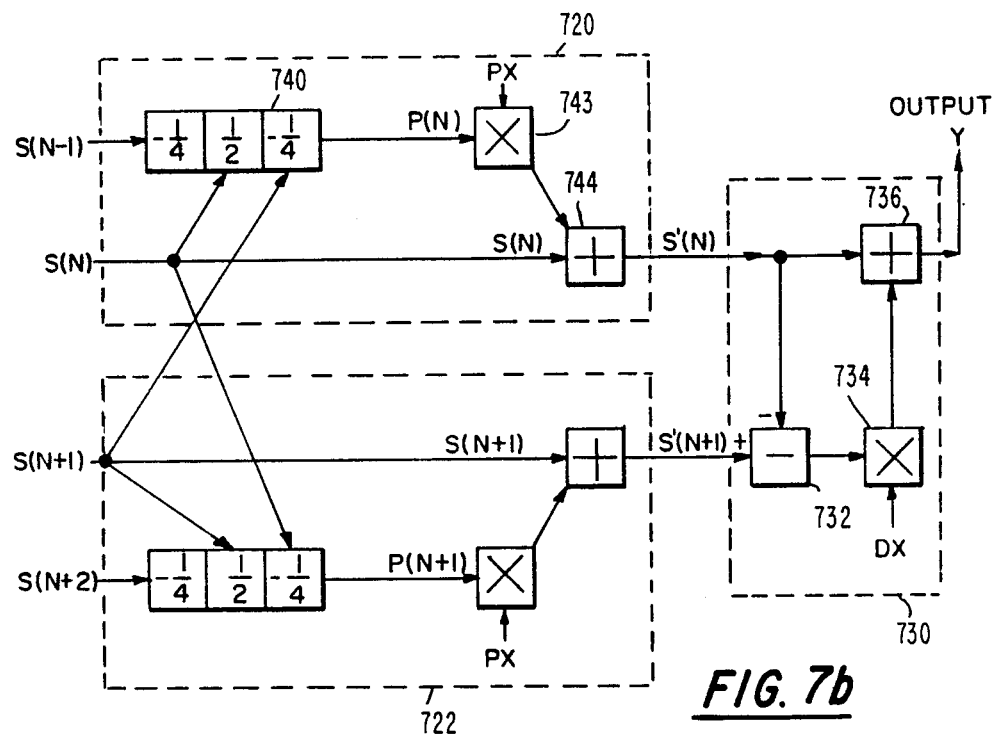
Figure 7C:
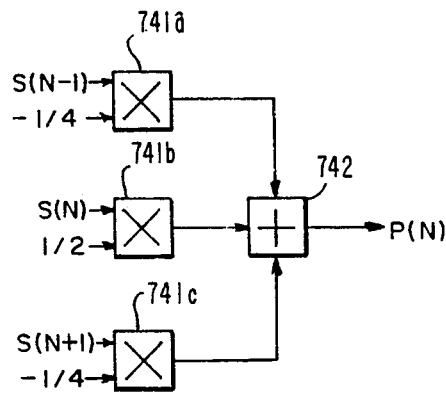
Figure 7D:
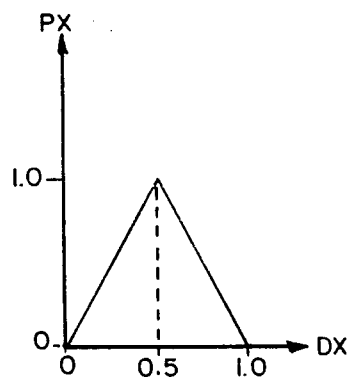

Signals S(N−1), S(N), S(N+1) and S(N+2) from memories 716a-716d are processed by a four-point linear interpolator including peaking filters 720 and 722, a PROM 725 and a two point linear interpolator 730, details of which are shown in FIGS. 7b and 7c. Peaking filters 720 and 722 receive three signals from the group of signals including signals S(N−1), S(N), S(N+1) and S(N+2), as shown, as well as receiving a peaking signal PX. The value of peaking signal PX varies from zero to unity as a function of the value of signal DX, as shown in FIG. 7d, and is provided by PROM 725 in response to signal DX. PROM 725 includes a look-up table and is programmed to produce a given value of PX in response to a given value of DX.

Peaking filters 720 and 722 respectively provide peaked mutually delayed video signals S'(N) and S'(N+1) to two-point linear interpolator 730 which also receives signal DX. Interpolator 730 provides a (compressed or expanded) video output signal Y, where output signal Y is defined by the expression $$Y = S'(N) + DX[S'(N+1) - S'(N)]$$

The described four-point interpolator and peaking function advantageously approximates a (sin X)/X interpolation function with good resolution of high frequency detail.

FIG. 7b shows details of peaking filters 720 and 722, and interpolator 730. In FIG. 7b, signals S(N−1), S(N) and S(N+1) are applied to a weighting circuit 740 where these signals are respectively weighted by peaking coefficients $-\frac{1}{4}$, $\frac{1}{2}$ and $-\frac{1}{4}$. As shown in FIG. 7c, weighting circuit 740 comprises multipliers 741a-741c for respectively multiplying signals S(N−1), S(N) and S(N+1) with peaking coefficients $-\frac{1}{4}$, $\frac{1}{2}$ and $-\frac{1}{4}$. Output signals from multipliers 741a-741c are summed in an adder 742 to produce a peaked signal P(N), which is multiplied by signal PX to produce a peaked signal which is summed with signal S(N) to produce peaked signal S'(N). Peaking filter 722 exhibits similar structure and operation.

In two point interpolator 730, signals S'(N) is subtracted from S'(N+1) in a subtractor 732 to produce a difference signal which is multiplied by signal DX in a multiplier 734. The output signal from multiplier 734 is summed with signal S'(N) in an adder 736 to produce output signal Y.

What is claimed is:

1. In a system for processing a video signal containing picture element (pixel) image information, apparatus comprising:
   video signal interpolator means having an input and an output; and
   peaking means for providing a peaked video signal to said input of said interpolator means, said peaking means providing a variable amount of peaking in accordance with a variable distance between predetermined pixels.

2. Apparatus according to claim 1, wherein:
   said peaking means provides a peaking control signal with a value between zero and unity, inclusive, in response to a distance representative signal with a fractional value equal to or greater than zero but less than unity.

3. Apparatus according to claim 1, wherein: said video signal is a widescreen signal having a greater than standard image aspect ratio with side portion image information and dominant non-side portion image information.

4. In a system for processing a video signal containing picture element (pixel) image information, apparatus comprising:
   video signal interpolator means having an input and an output;
   peaking means for providing a peaked video signal to said input of said interpolator means; and
   translating means for providing a time translated video signal, said translating means including means for providing a signal representing an integer number associated with a pixel location and providing a signal representing a fractional number associated with said integer number, said fractional number being representative of a distance between a time translated pixel and an original pixel; wherein
   said peaking means provides an amount of peaking in accordance with the value of said signal representing said fractional number.

5. Apparatus according to claim 4, wherein:
   said peaking means provides an amount of peaking in response to a peaking control signal responsive to the value of said signal representing said fractional number.

6. Apparatus according to claim 5, wherein:
   said peaking control signal is provided by a programmed memory device responsive to said signal representing said fractional number.

7. Apparatus according to claim 5, wherein:
   said peaking control signal exhibits a value between zero and unity.

8. Apparatus according to claim 4, wherein:
   said amount of peaking provided by said peaking means exhibits a maximum at a point between adjacent time translated pixels.

9. Apparatus according to claim 8, wherein:
   said amount of peaking provided by said peaking means exhibits a maximum at a point substantially mid-way between adjacent time translated pixels, and a minimum at points corresponding to locations of adjacent time translated pixels.

10. In a system for processing a video signal containing picture element (pixel) image information, apparatus comprising:
    video signal interpolator means having plural inputs and an output;

peaking means for providing peaked video signals to said inputs of said interpolator means;

means for providing plural video signals delayed from each other by a pixel interval; and means for conveying said plural delayed video signals to respective inputs of said peaking means; wherein said providing means provides first, second, third and fourth mutually sequentially delayed video signals in the order named;

said peaking means includes a first peaking filter responsive to said first, second and third video signals, and a second peaking filter responsive to said second, third and fourth video signals; and said inputs of said interpolator means receive respective output signals from said first and second peaking filters.

11. Apparatus according to claim 10, wherein said first filter means comprises:

means for weighting said first, second and third delayed video signals with given peaking coefficients to produce first, second and third weighted signals;

means for combining said first, second and third weighted signals to produce a combined weighted signal;

multiplier means responsive to said combined weighted signal and to a peaking control signal; and means for combining said second delayed signal with an output signal from said multiplier means to produce an output peaked signal for application to said interpolator means.

12. In a system for processing a widescreen video signal containing picture element (pixel) image information, and having a greater than standard image aspect ratio with main panel information and side panel information, apparatus in a video signal encoder, comprising:

video signal interpolator means having an input and an output;

peaking means for providing a peaked video signal to said input of said interpolator means; wherein said interpolator means receives a widescreen video signal having time expanded main panel information and time compressed side panel information.

13. In a system for processing a widescreen video signal containing picture element (pixel) image information, and having a greater than standard image aspect ratio with main panel information and side panel information, apparatus in a video signal decoder, comprising:

video signal interpolator means havine an input and an output;

peaking means for providing a peaked video signal to said input of said interpolator means; wherein said interpolator means receives a widescreen video signal having time compressed main panel information and time expanded side panel information.

14. In a system for processing a video signal containing picture element (pixel) image information apparatus comprising:

video signal interpolator means having plural inputs and an output;

peaking means for providing peaked video signals to said inputs of said interpolator means; and translating means for providing a time translated video signal, said translating means including means for providing a signal representing an integer number associated with a pixel location and providing a signal representing a fractional number associated with said integer number, said fractional number being representative of a distance between a time translated pixel and an original pixel; and wherein said peaking means provides an amount of peaking in accordance with the value of said signal representing said fractional number;

said peaking means provides a first peaked video signal and a second peaked video signal delayed relative to said first peaked video signal; and said interpolator means has first and second inputs for respectively receiving said first and second peaked video signals, said interpolator means further including means for subtractively combining said first and second peaked video signals to produce a combined signal;

multiplier means responsive to said combined signal and to said signal representative of a fractional number; and means for combining said first peaked video signal with an output signal from said multiplier means to produce an interpolated output signal.

* * * * *